United States Patent
Bertandeau et al.

(10) Patent No.: US 10,711,650 B2
(45) Date of Patent: Jul. 14, 2020

(54) INTERNAL STRUCTURE OF A PRIMARY EXHAUST DUCT

(71) Applicant: Airbus Operations SAS, Toulouse (FR)

(72) Inventors: Laurent Bertandeau, Tournefeuille (FR); Grégory De Oliveira, Saint Alban (FR); Erwan Krier, Fonsorbes (FR); Sandrine Andre, Paulhac (FR); Morad Kassem, Toulouse (FR); Michael Kilkenny, Toulouse (FR)

(73) Assignee: AIRBUS OPERATIONS SAS, Toulouse (FR)

(*) Notice: Subject to any disclaimer, the term of this patent is extended or adjusted under 35 U.S.C. 154(b) by 60 days.

(21) Appl. No.: 16/195,142

(22) Filed: Nov. 19, 2018

(65) Prior Publication Data

US 2019/0162079 A1    May 30, 2019

(30) Foreign Application Priority Data

Nov. 28, 2017 (FR) ...................... 17 61255

(51) Int. Cl.
*F01D 25/30* (2006.01)
*F02K 1/82* (2006.01)
(Continued)

(52) U.S. Cl.
CPC ............ *F01D 25/30* (2013.01); *B64D 33/04* (2013.01); *F01D 25/24* (2013.01); *F01D 25/28* (2013.01);
(Continued)

(58) Field of Classification Search
CPC ........ F01D 25/30; F01D 25/32; F01D 25/305; F01D 25/28; F01D 25/24; F01D 25/26
(Continued)

(56) References Cited

U.S. PATENT DOCUMENTS

| | | | | |
|---|---|---|---|---|
| 2,988,302 A | * | 6/1961 | Smith | ........................ F02K 1/36 244/15 |
| 4,751,979 A | * | 6/1988 | Wiseman | ................... F02C 7/24 181/213 |

(Continued)

FOREIGN PATENT DOCUMENTS

| | | |
|---|---|---|
| EP | 1391597 A2 | 2/2004 |
| EP | 3159522 A1 | 4/2017 |

OTHER PUBLICATIONS

French Search Report; priority document.

*Primary Examiner* — Ninh H. Nguyen
*Assistant Examiner* — Jason Mikus
(74) *Attorney, Agent, or Firm* — Greer, Burns & Crain, Ltd.

(57) ABSTRACT

An internal structure of a primary exhaust duct of a turbomachine. The internal structure comprises a primary wall comprising a surface of revolution, allowing air to pass through the orifices and forming an internal surface of the primary exhaust duct, an interior skin, comprising a surface of revolution, arranged inside the primary wall and extending between an upstream flank for facing toward the front of the turbomachine and a downstream flank for facing toward the rear of the turbomachine, and a plurality of spacers angularly distributed around a periphery of the interior skin and fixed between the primary wall and the interior skin. The particular way in which the interior wall is fixed makes the internal structure easier to construct and allows attenuation of noise at chosen frequencies.

9 Claims, 3 Drawing Sheets

(51) Int. Cl.
*F01D 25/24* (2006.01)
*F02C 7/24* (2006.01)
*B64D 33/04* (2006.01)
*F01D 25/28* (2006.01)
*F02K 1/04* (2006.01)

(52) U.S. Cl.
CPC .................. *F02C 7/24* (2013.01); *F02K 1/04* (2013.01); *F02K 1/827* (2013.01); *F05D 2220/323* (2013.01); *F05D 2240/90* (2013.01); *F05D 2250/75* (2013.01); *F05D 2260/30* (2013.01); *F05D 2260/96* (2013.01)

(58) Field of Classification Search
USPC ......................................................... 415/119
See application file for complete search history.

(56) References Cited

U.S. PATENT DOCUMENTS

| 7,784,283 | B2 | 8/2010 | Yu et al. | |
|---|---|---|---|---|
| 2004/0076512 | A1* | 4/2004 | Lata Perez | F02C 7/24 |
| | | | | 415/119 |
| 2004/0187476 | A1* | 9/2004 | Lair | B64D 33/04 |
| | | | | 60/226.1 |
| 2010/0205930 | A1 | 8/2010 | Conete et al. | |
| 2017/0107909 | A1 | 4/2017 | Loewenstein et al. | |

* cited by examiner

INTERNAL STRUCTURE OF A PRIMARY EXHAUST DUCT

CROSS-REFERENCES TO RELATED APPLICATIONS

This application claims the benefit of the French patent application No. 1761255 filed on Nov. 28, 2017, the entire disclosures of which are incorporated herein by way of reference.

BACKGROUND OF THE INVENTION

The present invention relates to an internal structure of a primary exhaust duct of a turbomachine, to a turbomachine comprising such an internal structure, and to an aircraft comprising at least one such turbomachine.

A turbomachine conventionally comprises, from upstream to downstream, an air inlet via which the air enters the turbomachine, a motor which burns the air with fuel, and an exhaust duct via which the burnt gases are discharged.

Such a turbomachine generates noise when it is in operation.

In order to attenuate some of the noise, the turbomachine is surrounded by a nacelle comprising noise attenuating means such as, for example, honeycomb structures.

The low-frequency (between 300 Hz and 1000 Hz) sounds, particularly those associated with combustion, emitted by the turbomachine during take-off or landing form a significant source of noise in the environment and, in order to attenuate this noise, it is known practice to fit low-frequency sound attenuating devices in the structure of the primary exhaust duct (the English term "plug" is used for this).

The primary exhaust duct is situated in the continuation of the engine and in front of the jet pipe cone and its exterior primary wall is in contact with the stream of burnt gas coming from the engine.

Document U.S. Pat. No. 7,784,283 discloses the production of compartments separated by dividing partitions under the perforated primary wall of the primary exhaust duct in order to form Helmholtz resonators.

Such a device is effective although it is necessary to find new modes of embodiment.

SUMMARY OF THE INVENTION

It is one object of the present invention to propose an internal structure of a primary exhaust duct of a turbomachine which comprises devices for attenuating low frequency noises which is simple and easy to implement.

To that end, the invention proposes an internal structure of a primary exhaust duct of a turbomachine, the internal structure comprising:
  a primary wall comprising a surface of revolution, allowing air to pass through the orifices and forming an internal surface of the primary exhaust duct,
  an interior skin, comprising a surface of revolution, arranged inside the primary wall and extending between an upstream flank intended to face toward the front of the turbomachine and a downstream flank intended to face toward the rear of the turbomachine, and
  a plurality of spacers angularly distributed around the periphery of the interior skin and fixed between the primary wall and the interior skin.

The particular way in which the interior wall is fixed makes the internal structure easier to construct and allows attenuation at chosen frequencies.

Advantageously, each of the flanks of the interior skin lies some distance away from the primary wall so as to leave a free passage between the interior skin and the primary wall.

Advantageously, the spacers are fixed to the interior skin by removable fixing means.

Advantageously, each spacer adopts the shape of a C-section with a central wall and two flanges.

Advantageously, the central wall has a through-recess.

Advantageously, the spacer comprises a flap able to move according to temperature between a closed position in which it closes off the through-recess and an open position in which it does not close off the through-recess.

Advantageously, the flap is made from shape memory alloy.

Advantageously, the interior skin is pierced with drainage holes.

According to one preferred embodiment, the interior skin is formed by machining a single element.

According to another particular embodiment, the interior skin is made up of several portions fixed together.

The invention also proposes a turbomachine comprising a primary exhaust duct delimited on the outside by a primary jet pipe and on the inside by an internal structure according to one of the preceding variants.

The invention also proposes an aircraft comprising at least one turbomachine according to the preceding variant.

BRIEF DESCRIPTION OF THE DRAWINGS

The abovementioned features of the invention, together with others, will become more clearly apparent from reading the following description of one exemplary embodiment, the description being given in connection with the attached drawings among which.

DETAILED DESCRIPTION OF THE PREFERRED EMBODIMENTS

Figure 1:
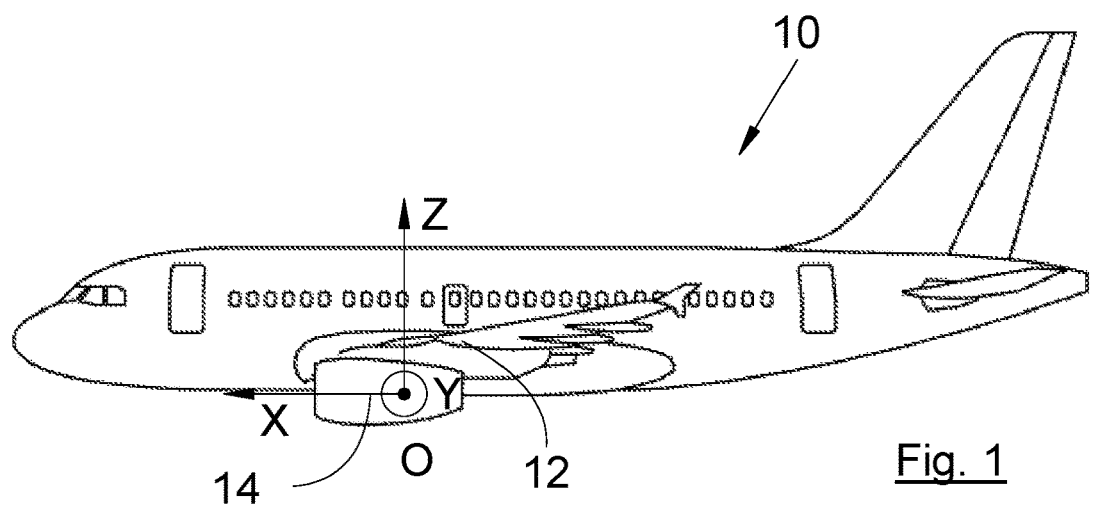
FIG. 1 is a side view of an aircraft according to the invention.

FIG. 1 shows an aircraft 10 which comprises a wing 12 under which is fixed a nacelle 14 in which a turbomachine is housed.

In the description which follows, and by convention, the longitudinal axis of the turbomachine, oriented positive in the direction of forward travel of the aircraft 10 and which is also the longitudinal axis of the nacelle 14 is referred to as X, the transverse axis which is horizontal when the aircraft 10 is on the ground is referred to as Y, and the vertical axis or vertical height when the aircraft 10 is on the ground is referred to as Z, these three directions X, Y and Z being orthogonal to one another and forming an orthonormal frame of reference.

In the description which follows, terms relating to a position are considered with reference to the direction of travel of the gases through the turbomachine, namely from the front towards the rear of the aircraft 10.

Figure 2:
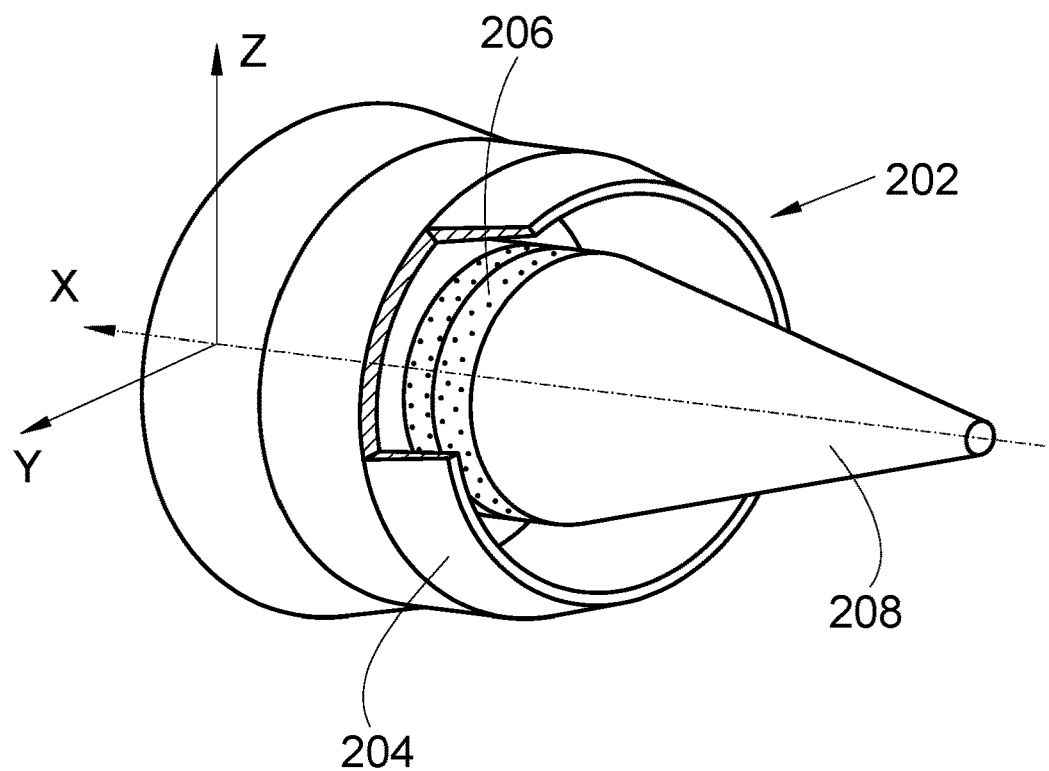
FIG. 2 is a perspective view of a primary exhaust duct.

FIG. 2 shows the rear part of the turbomachine which forms a primary exhaust duct 202 via which the gases burnt by the turbomachine are discharged and which is delimited on the outside by a primary jet pipe 204 and on the inside by an internal structure 206 of the primary exhaust duct 202.

The primary exhaust duct 202, like its internal structure 206, have an overall shape comprising surfaces of revolution about the longitudinal axis X of the turbomachine.

A jet pipe cone 208 is fixed at the rear of the internal structure 206.

Figure 3:
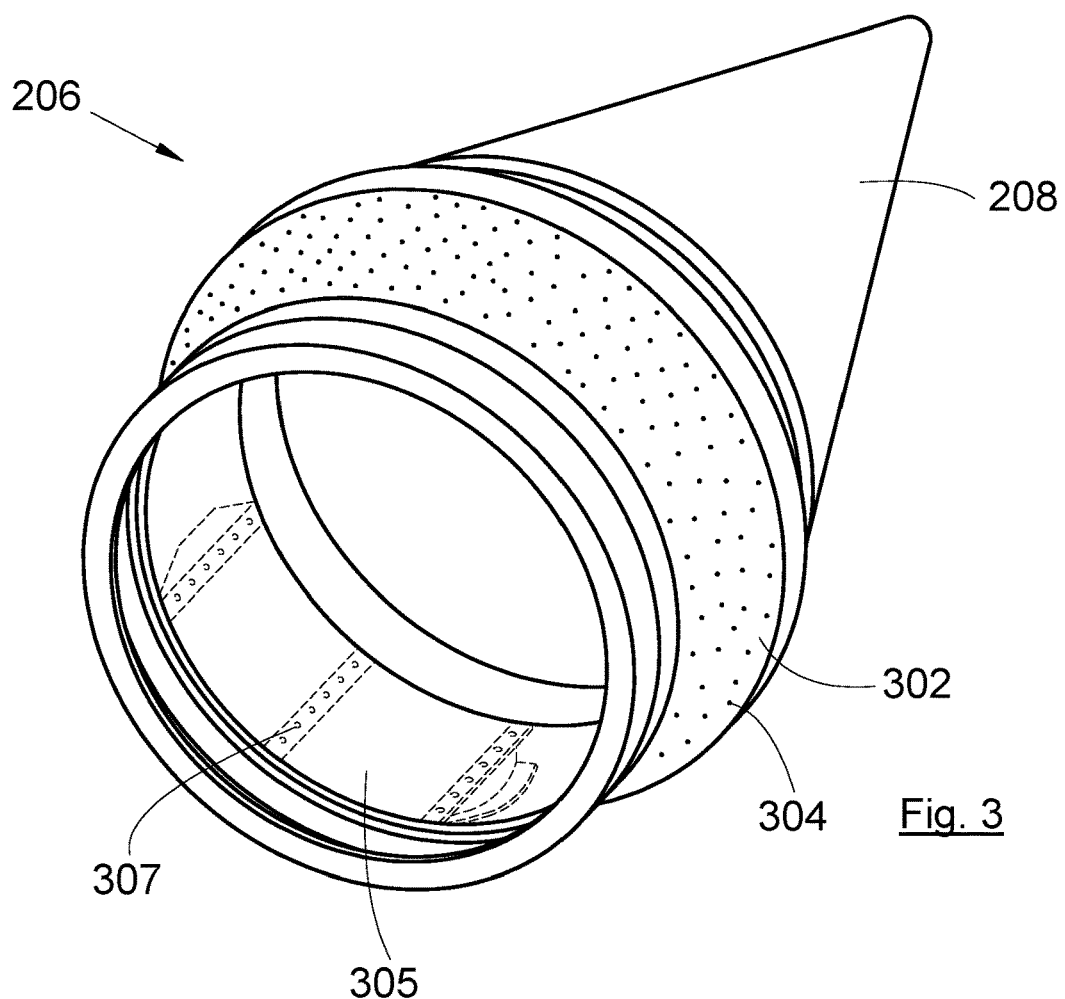
FIG. 3 is a perspective view of an internal structure of a primary exhaust duct according to the invention.
Figure 4:
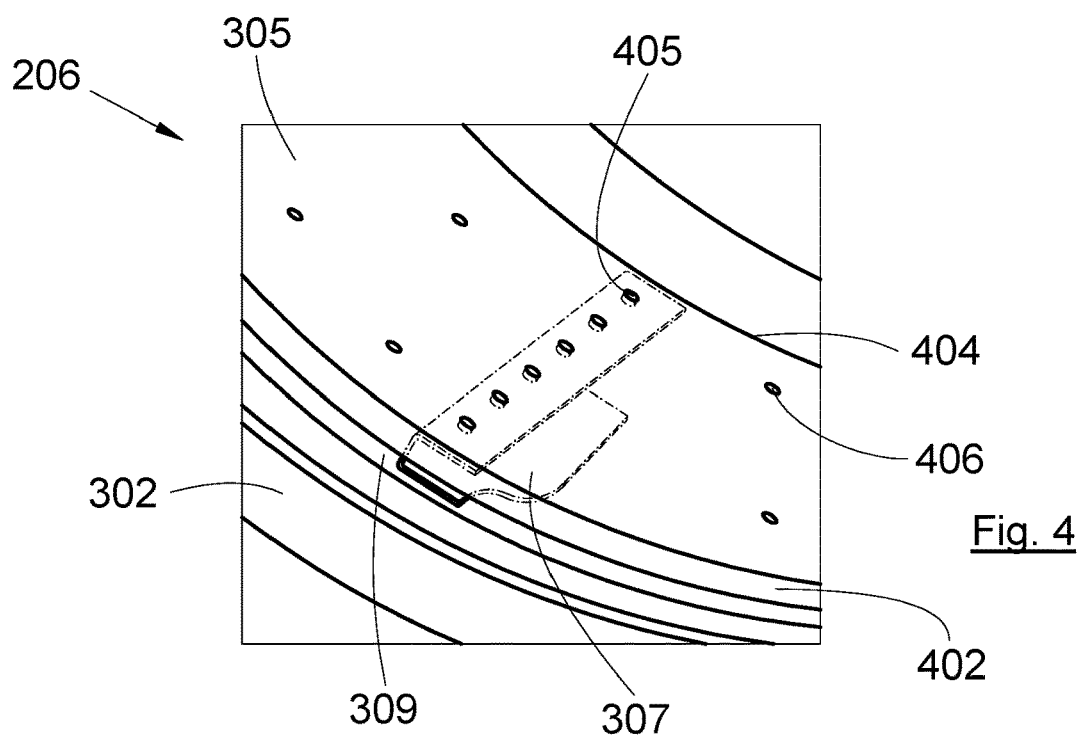
FIG. 4 is an enlargement of a detail of the internal structure of FIG. 3.

FIG. 3 shows a view from the front and in perspective of the internal structure 206 and of the cone 208, and FIG. 4 shows an enlargement of the internal structure 206.

The internal structure 206 comprises a primary wall 302 pierced with holes 304 distributed over the surface of the primary wall 302. The primary wall 302 forms the exterior surface of the internal structure 206, namely the surface that forms the internal surface of the primary exhaust duct 202.

The internal structure 206 comprises an interior skin 305. The primary wall 302 and the interior skin 305 each constitute a surface of revolution which in this example is cylindrical overall, and the interior skin 305 is arranged inside the primary wall 302 in such a way as to form an assembly of two coaxial surfaces.

The interior skin 305 is fixed to the primary wall 302 by spacers 307 fixed between the primary wall 302 and the interior skin 305 and angularly distributed around the periphery of the interior skin 305. The spacers 307 can be seen as hidden detail in FIGS. 3 and 4.

The interior skin 305 extends between an upstream flank 402 oriented towards the front of the turbomachine and a downstream flank 404 oriented towards the rear of the turbomachine. Each flank 402, 404 here adopts the shape of a crown.

As shown in FIG. 4, the interior skin 305 and the primary wall 302 are not fixed to one another. What this means to say is that each of the flanks 402 and 404 of the interior skin 305 lies some distance away from the primary wall 302, so as to leave a free passage 309 which allows air to circulate freely between the interior skin 305 and the primary wall 302.

The interior skin 305 is thus fixed only by the spacers 307, making the implementation easier because there is no need to provide a connection between the primary wall 302 and the interior skin 305. Furthermore, the passage 309 makes it possible to afford better absorption of the sounds caused by vibrations of the interior wall 305 brought about by the fact that its flanks 402 and 404 are not fixed.

Between two consecutive spacers 307, the volume between the interior wall 305 and the primary wall 302 forms a box constituting a Helmholtz resonator.

In order to allow ease of demounting of the interior skin 305, the spacers 307 are fixed to the interior skin 305 using removable fixing means such as screws, for example and, for that purpose, the interior skin 305 and the spacer 307 have bores 405 provided for that purpose. The removable fixing means are elements which can be taken out without damaging the interior skin 305 and the spacers 307.

The fixing of each spacer 307 to the primary wall 302 may be performed by using removable fixing means such as screws or permanent fixing means such as welding, for example.

In the invention embodiment depicted in FIGS. 3 to 6, each spacer 307 takes the form of a C-section with a central wall (504 in FIG. 5) and two flanges (506a-b in FIG. 5), although other forms are possible such as, for example, the shape of posts or of profile sections of different shapes.

In the case of a spacer 307 having a C-section profile, the spacer 307 is fixed to the interior skin 305 and to the primary wall 302 using one of the flanges 506a-b of the C-section profile and, where appropriate, the interior skin 305 or the primary wall 302.

According to one first exemplary embodiment of the invention depicted in FIG. 3, the spacer 307 takes the form of a C-section profile, the central wall 504 of which is solid.

Figure 5:
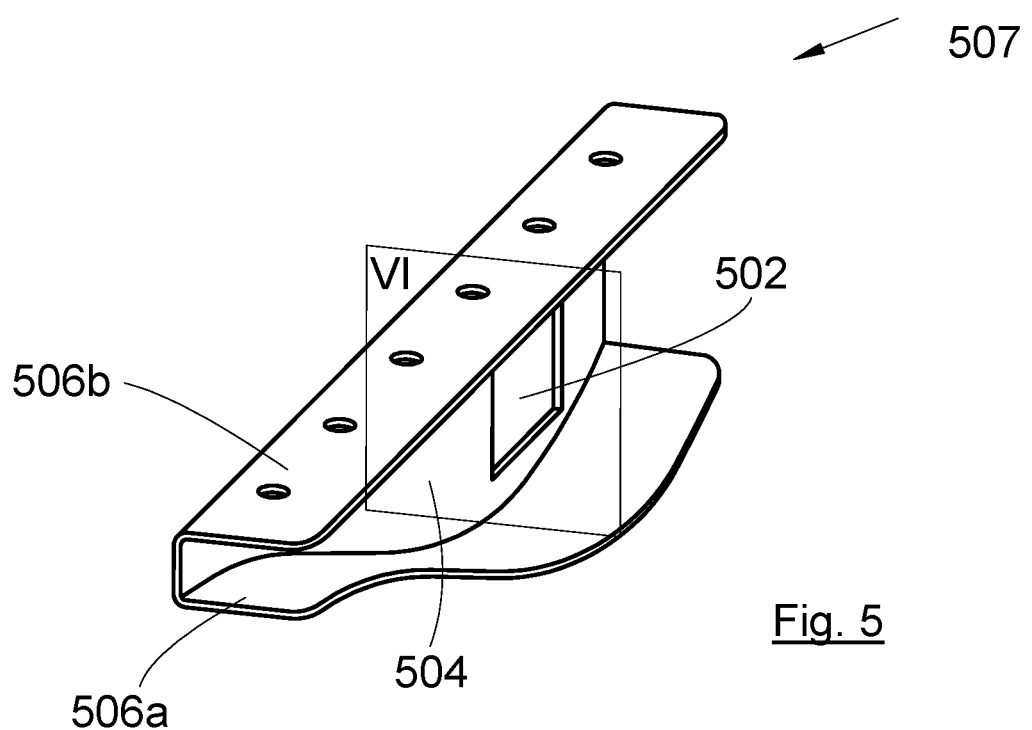
FIG. 5 is a perspective view of one example of a spacer employed in the internal structure according to the invention.
Figure 6:
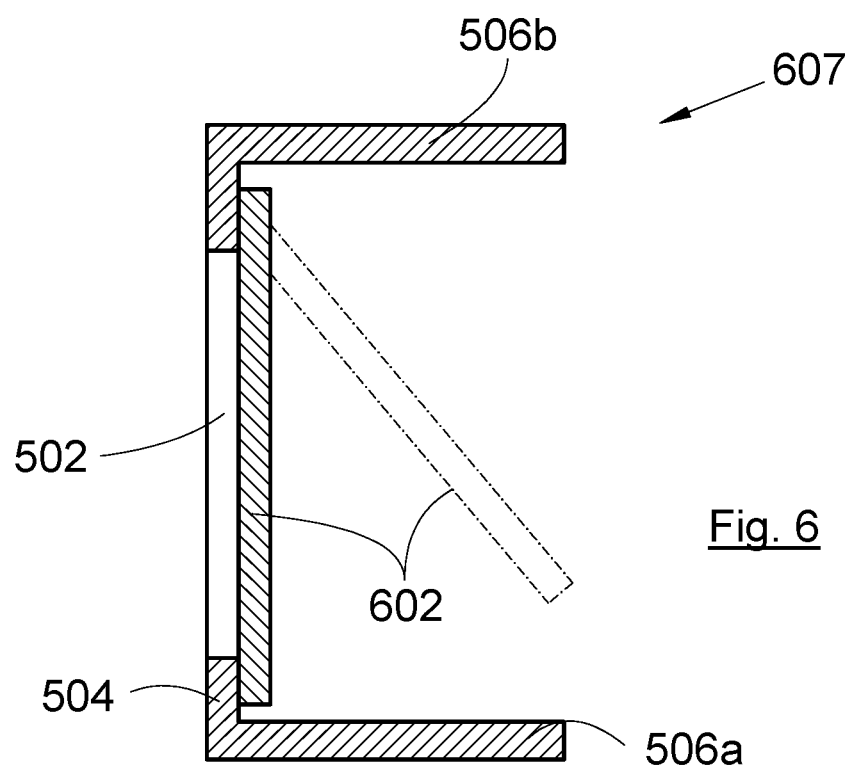
FIG. 6 is a view in section on the plane VI of FIG. 5, of a spacer according to a variant of the invention.

FIG. 5 shows a spacer 507 with a C-section profile according to a second particular form of embodiment and FIG. 6 shows a spacer 607 with a C-section profile according to a third particular embodiment.

In the embodiment of FIG. 5, the spacer 507 has a central wall 504 which exhibits a through-recess 502 so as to provide better communication between the boxes.

In the embodiment of FIG. 6, the spacer 607 has a central wall 504 with a through-recess 502 and a flap 602 which is able to move on the spacer 607 and according to temperature, between a closed position (in solid line) in which it closes off the through-recess 502, and an open position (in chain line), in which it does not close off the through-recess 502. Thus, as the frequencies of sound vary as a function of temperature, the opening of the flap 602 can be adapted to the ambient temperature and thus allow optimal absorption of sound whatever its temperature. In general, the flap 602 is designed to open upon an increase in temperature and to close upon a drop in temperature.

In order for the positioning of the flap 602 to be consistent with the temperature, the flap 602 is made of a shape memory alloy having a shape and characteristics which are suited to the temperature range that is to be covered.

In order to remove any water which may infiltrate, the interior skin 305 is pierced with drainage holes 406.

The interior skin 305 is preferably formed by machining a single element, but could equally be made up of several portions joined together, particularly by welding.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An internal structure of a primary exhaust duct of a turbomachine, the internal structure comprising:
   a primary wall comprising a surface of revolution, allowing air to pass through orifices at each end of the surface of revolution and forming an internal surface of the primary exhaust duct,
   an interior skin, comprising a surface of revolution, arranged inside the primary wall and extending between an upstream flank configured to face toward the front of the turbomachine and a downstream flank configured to face toward the rear of the turbomachine, and a plurality of spacers angularly distributed around a periphery of the interior skin and fixed between the primary wall and the interior skin, wherein each spacer adopts a C-section shape with a central wall and two flanges, wherein the central wall has a through-recess, and wherein each spacer comprises a flap configured to move, according to temperature, between a closed position in which the flap closes off the through-recess and an open position in which the flap does not close off the through-recess.

2. The internal structure according to claim 1, wherein each of the upstream flank and downstream flank of the interior skin lies some distance away from the primary wall so as to leave a free passage between the interior skin and the primary wall.

3. The internal structure according to claim 1, wherein the spacers are fixed to the interior skin by removable fixing means.

4. The internal structure according to claim 1, wherein the flap is made from shape memory alloy.

5. The internal structure according to claim 1, wherein the interior skin is pierced with drainage holes.

6. The internal structure according to claim 1, wherein the interior skin is formed by machining a single element.

7. The internal structure according to claim 1, wherein the interior skin is made up of several portions fixed together.

8. A turbomachine comprising a primary exhaust duct delimited on an outside by a primary jet pipe and on an inside by an internal structure according to claim 1.

9. An aircraft comprising at least one turbomachine according to claim 8.

* * * * *